Nov. 6, 1923.

R. A. BAKKE

FLYTRAP

Filed June 14, 1922

1,473,538

Inventor
R. A. Bakke,

By
Attorney

Patented Nov. 6, 1923.

1,473,538

UNITED STATES PATENT OFFICE.

REIER A. BAKKE, OF REDTOP, MINNESOTA.

FLYTRAP.

Application filed June 14, 1922. Serial No. 568,181.

*To all whom it may concern:*

Be it known that REIER A. BAKKE, a citizen of the United States of America, residing at Redtop, in the county of Aitkin and State of Minnesota, has invented new and useful Improvements in Flytraps, of which the following is a specification.

The object of the inventiton is to provide a simple and efficient fly trap for household use; and with this object in view the invention consists in a construction and combination of parts of which a preferred embodiment is shown in the accompanying drawings, wherein:—

Figure 1:
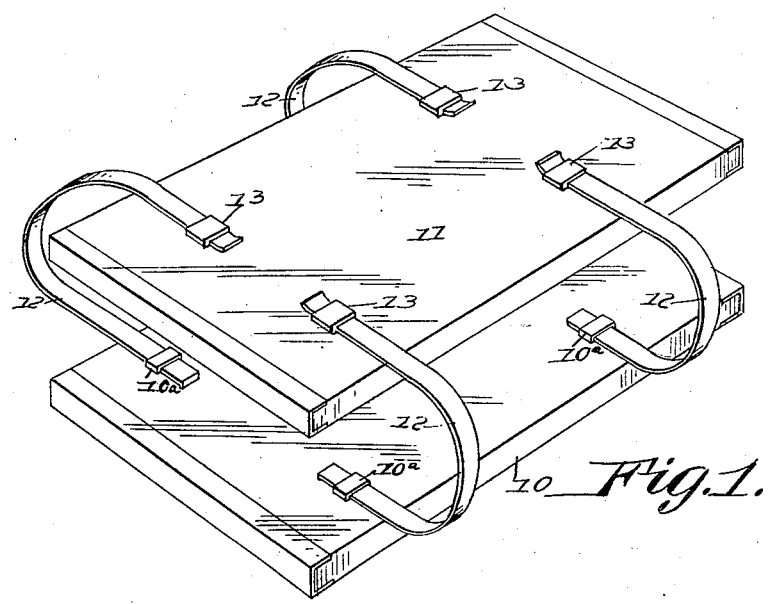
Figure 1 is a perspective view of a device embodying the invention.
Figure 2:
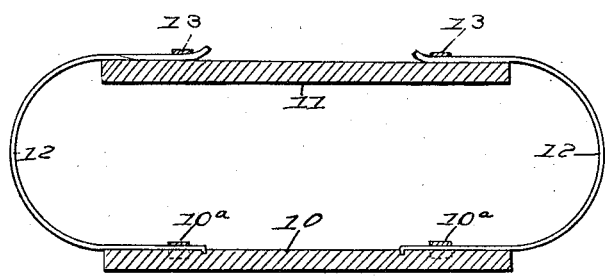
Figure 2 is a transverse sectional view of the same.

The device consists essentially of a base 10 and a spring supported follower 11 mounted upon the base, the springs 12 which normally and yieldingly maintain the base and follower in spaced relation being of looped form, secured at their lower ends to the base and having their upper free ends fitted removably in keepers 13 on the upper surface of the follower.

In practice the inner or facing surfaces of the base and follower or one of them should be baited by the application thereto of a sweet material such as molasses or its equivalent attractive to flies and when the flies have ammumulated to the desired extent on said surfaces the follower may be actuated by a sharp blow or stroke of the hand or a suitable implement to depress it in opposition to the supporting springs into contact wth the surface of the base so as to crush and destroy the flies.

The detachability of the springs from the follower enables the surfaces of the parts to be readily cleaned and scraped preparatory to a second baiting.

Having described the invention, what is claimed as new and useful is:—

As an article of manufacture a fly trap consisting of a base carrying laterally looped springs, and a follower plate having keepers for receiving the free ends of said springs and being thereby normally and yieldingly supported in spaced relation with the base to permit of the access of flies to the opposed baited surfaces of said members.

In testimony whereof he affixes his signature.

REIER A. BAKKE.